United States Patent [19]
Murphy et al.

[11] Patent Number: 5,603,844
[45] Date of Patent: Feb. 18, 1997

[54] INSTANT, CHEMICAL-FREE DECHLORINATION OF WATER SUPPLIES

[75] Inventors: Andrew P. Murphy, Littleton; Lisa H. Rowley, Evergreen, both of Colo.

[73] Assignee: The United States of America as represented by the Secretary of the Interior, Washington, D.C.

[21] Appl. No.: 468,403

[22] Filed: Jun. 6, 1995

Related U.S. Application Data

[62] Division of Ser. No. 124,879, Sep. 22, 1993, abandoned.

[51] Int. Cl.$^6$ .................................................. C02F 1/70
[52] U.S. Cl. ............................................ 210/757; 210/763
[58] Field of Search ............................ 210/756, 757, 210/763

[56] References Cited

U.S. PATENT DOCUMENTS

| | | | |
|---|---|---|---|
| 4,073,873 | 2/1978 | Caldwell et al. | 210/763 |
| 4,731,475 | 3/1988 | Tanimoto et al. | 562/475 |

*Primary Examiner*—Ivars Cintins
*Attorney, Agent, or Firm*—E. Philip Koltos

[57] ABSTRACT

Chemical-free autodecomposition of chlorine species to chloride ion and oxygen gas by contacting a chlorine containing liquid solution with a decomposition catalyst consisting of transition metals and their compounds in association with a high surface area per mass. The catalyst comprises Raney metals selected from the group including Raney Cu, Raney Ni, and Raney Co, and aluminum doped with transition metals selected from the group including vanadium, chromium, manganese, iron, cobalt, nickel, copper and zinc.

5 Claims, No Drawings

INSTANT, CHEMICAL-FREE DECHLORINATION OF WATER SUPPLIES

This is a division of application Ser. No. 08/124,879 filed Sep. 22, 1993, now abandoned.

BACKGROUND OF THE INVENTION

1. Field of the Invention

This invention relates generally to the decomposition of chlorine from water and more specifically to the use of transition metals, and their compounds, in association with high surface area per mass, for instant autodecomposition of chlorine species to chloride ion and oxygen gas.

2. Description of the Prior Art

Over the years, many attempts have been made to provide an effective system for the removal of contaminants from aqueous systems to provide safe drinking water for human consumption.

Such contaminants include organic compounds such as trihalomethanes as well as inorganic contaminants such as arsenic, cadmium, lead, copper, mercury, chromium and selenium.

Drinking water may also contain various microorganisms such as bacteria, virus, fungus, and protozoa, as well as finely divided and suspended particles derived from soil, silt and inorganic fibers such as asbestos fibers.

For example, ion exchange systems have been employed which employ ion exchange resins such as cation exchange resins to reduce water hardness by exchanging calcium and magnesium for sodium. Chlorine has been found to reduce the effectiveness of such resin materials Reverse osmosis has also been employed to remove contaminants by the combined action of osmotic pressure and a selective membrane material. Chlorine frequently is found to have a deleterious effect on such membranes.

Activated carbon has recently achieved much popularity in domestic water purification systems, yet it experiences many drawbacks due to its failure to remove a wide range of contaminants from the water as well as its tendency to quickly become relatively ineffective and/or become contaminated with bacteria. Combinations of the above systems have also been contemplated.

Several prior art processes currently in use are as follows: The first process is the use of reducing agents such as sulfur dioxide, bisulfite, or sulfite. The disadvantages of this process are—the costs associated with the use of these chemical reductants, the addition of other ionic species to the water as a result of such oxidation-reduction reactions, the inconvenience of having to use pumps, storage tanks for the chemicals, and meters of various kinds, and long reaction times relative to the instant invention. The Bureau of Reclamation is presently using this approach to dechlorinate water at the Yuma, Arizona Desalting Plant.

A second process is the use of activated charcoal. The disadvantages of this process are—The expense of replacement as the activated charcoal is used up either by the chlorine, organics in the water supply, or bacteria colonies in the charcoal making the process unsafe for drinking water and risky for desalting membranes, and there is only a partial removal of chlorine.

A third process is the use of cobalt and nickel compounds for the autodecomposition of chlorine from water. There are numerous patents on the removal of chlorine from water using cobalt and nickel compounds:

U.S. Pat. No. 1,153,502 to Kriegsheim entitled "Manufacture of Oxygen";

U.S. Pat. No. 1,197,640 to Kriegsheim entitled "Purification of Water";

U.S. Pat. No. 2,520,181 to Teter et al entitled "Process of Preparing Amines and Nitriles from Ammonia and Olefins";

U.S. Pat. No. 3,965,249 to Kinosz entitled "Anti-Pollution Method";

U.S. Pat. No. 4,073,873 to Caldwell et al entitled "Catalytic Decomposition of Hypochlorite";

U.S. Pat. No. 4,297,333 to Crawford et al entitled "Method of Decomposing Hypochlorite ion in a Basic Solution";

U.S. Pat. No. 4,732,688 to Bryan et al entitled "Effluent Treatment";

U.S. Pat. No. 4,764,286 to Bon et al entitled "Catalytic Decomposition of Sodium Hypochlorite in Highly Alkaline Solutions";

U.S. Pat. No. 4,879,047 to Jackson entitled "Effluent Treatment".

Basically, Kriegsheim discovered that "hypochlorite in solution in contact with certain metallic oxides split up smoothly and completely into corresponding chlorides and free oxygen". This is where all of the other patents on the autodecomposition of chlorine in water began. However, all of the prior art in this area have the following disadvantages: No effective way of increasing the reaction rate such that the chlorine is removed almost immediately; Undesirable concentrations of metals in the product water, this is obvious from the chemicals used-undesirable concentrations for drinking water and desalting membranes can be 1 mg/L or less; No data to demonstrate the removal of trace chlorine (a mg/L or less) from water. Regulatory agencies have set below mg/L concentrations of these heavy metals in drinking water. Some publications on the harmful effects of these metals on membranes are:

Murphy, A. P., "Accelerated Deacetylation of Cellulose Acetate by Metal Salts with Aqueous Chlorine", Journal of the Water Pollution Control Federation, Vol. 63, pp. 177–180, 1991.

Murphy, A. P., "Deterioration of Cellulose Acetate by Transition metal Salts in Aqueous Chlorine", Desalination, Vol. 85, pp. 45–52, 1991.

Additional prior art devices are disclosed in U.S. Pat. No. 4,073,873 to Caldwell discloses a process for decomposing large quantities of dilute hypochlorites in aqueous streams wherein hypochlorite ions in aqueous solution are catalytically decomposed by the action of a single-spinel of $Co_3O_4$ coated on an inert, stable support.

U.S. Pat. No. 5,039,429 to Laundon et al discloses a process for the removal of hypochlorite groups from aqueous solutions, so as to permit the disposal of the effluent by deep well injection. The invention relates to the catalytic decomposition of such hypochlorite groups from scrubbing water effluent used to remove chlorine from a gaseous effluent, wherein a solid catalyst is dissolved, recycled, and reprecipated in situ. The catalyst is a transition metal, in the group from copper to zinc, and selected from the group consisting of copper, nickel, iron and manganese.

U.S. Pat. No. 5,149,437 to Wilkinson et al discloses a process for removing contaminants from water comprising a filter housing having an inlet at one end for water to be purified and an outlet for purified water at an opposing end, the filter device includes in sequence, first, second and third layers of purification material, a first layer comprising metallic particles which establish a suitable redox potential in the first layer, a second layer comprising activated carbon, and a third layer comprising a weak acid ion exchange resin. The three purification materials must be present in the filter device in the stated order.

None of the patents discuss the use of Raney metals or alumina doped with a transition metal.

OBJECTS OF THE INVENTION

It is one object of the invention to provide a water filter which exhibits a long useful life.

Another object of the invention is to provide a catalyst for use in the present inventive method which is efficient, is non-polluting and is long lived.

A further object of the present invention is to provide chemical-free, dechlorination of potable and other water supplies.

A still further object of the present invention is to remove chlorine from reverse osmosis desalting plants and for domestic water supplies just prior to consumption.

Yet another object of the present invention is to remove chlorine from water by using transition metals, and their compounds, in association with high surface area per mass.

Still another object of the present invention is to remove oxidants in water such as hydrogen peroxide, chloramines, ozone, bromides, bromates etc.

These and other objects are attained by the invention disclosed hereinafter. Variations in the embodiments described herein will become apparent to practitioners of the pertinent art without departing from the invention as claimed.

SUMMARY OF THE INVENTION

The present invention makes use of transition metals, and their compounds, in association with high surface area per mass, without hydrogen and with aqueous liquids (or water) for the purpose of an instant autodecomposition of chlorine species to chloride ion and oxygen gas. The process operates at room temperature.

Hydrogenation catalysts are substances used with hydrogen gas to reduce (or add hydrogen) to non-aqueous liquids such as fats and oils. For example, spongy metal alloys have been found to be effective. Spongy metals began with the discovery of Murry Raney in 1927 (U.S. Pat. No. 1,628, 190). This was a major technological achievement for the hydrogenation of oils and fats. He discovered that if he alloyed metals such as nickel and cobalt with aluminum, and then leached the aluminum with caustic, a spongy metal would result with an extremely high surface area per mass. Metals such as nickel were known to absorb hydrogen and could be used to hydrogenate oils and fats. With Raney's discovery, the rate of hydrogenation could be greatly increased resulting in a very successful process.

A first embodiment of the present invention uses Rany metals in a novel way. Instead of using these spongy metals with hydrogen for chemical reduction, these metals are used "as is" to provide extremely high surface area per mass for the decomposition of chlorine from water.

A second embodiment of the present invention uses alumina doped with a transition metal such as nickel or cobalt. Alumina can be produced with a high surface area per mass. By adding a solution of the transition metal salt (a solution in which the anion is organic) to the alumina, and heating at high temperatures, the organic anion oxidizes to carbon dioxide gas, and the transition metal remains behind on the alumina.

Such materials as alumina doped with a transition metal as described above exist commercially. Their industrial application is as a hydrogenation catalyst, similar to the Raney alloys described above.

The tests described in the present invention show that either, spongy metals, or alumina doped with a transition metal can be used to cause an instant dechlorination of water supplies.

EXAMPLE 1

Raney Metals Dechlorinate and at a Rate Faster Than Their Corresponding Metal Powders Add a 1 g sample of Raney metal or powdered metal to each labeled glass bottle. Next, add 25 mL of approximately 1 mg/L $Cl_2$ to each bottle. Wait 10 minutes and measure each bottle for total chlorine.

| COMPOUND | INITIAL $Cl_2$ | FINAL $Cl_2$ |
| --- | --- | --- |
| Raney Cu | 1.12 | 0.07 |
| Cu (325 mesh) | 1.12 | 0.84 |
| Raney Ni | 1.12 | 0.05 |
| Ni (325 mesh) | 1.12 | 0.81 |
| Raney Co | 1.12 | 0.01 |
| Co (325 mesh) | 1.12 | 0.73 |

EXAMPLE 2

Raney Metals Used in a Continuous Dechlorination Process With Very Fast Contact Times FIG. 1 shows the test equipment used for the continuous dechlorination process of the present invention. A feed tank 1 is filled with approximately 50 L of water to which chlorine 2 is added to the desired stock concentration. The chlorinated water is pumped via line 3 to any of the catalysts located at positions 5, 6, 7, and 8. Samples were taken at position 4 for the initial concentration and after the catalysts as shown in FIG. 1.

The following data were collected with at least 30 L of chlorinated water. A sample was taken at the end of the run, the operation parameters recorded, and the sample analyzed for total chlorine, and metals.

| Raney Cu | |
| --- | --- |
| Flow rate (mL/min.) | 86 |
| Pressure (kPa) | 225 |
| Temperature (°C.) | 18 |
| Feed Chlorine (mg/L | 1.49 |
| Product Chlorine (mg/L) | 0.07 |
| Total Co (mg/L) | <0.01 |
| Total Cu (mg/L) | 0.20 |
| Total Ni (mg/L) | <0.01 |
| Contact Time (min.) | 0.07 |
| Raney Ni | |
| Flow rate (mL/min.) | 88 |
| Pressure (kPa) | 160 |
| Temperature (°C.) | 19 |
| Feed Chlorine (mg/L) | 1.13 |
| Product Chlorine (mg/L) | 0.03 |
| Total Co (mg/L) | <0.01 |
| Total Cu (mg/L) | <0.01 |
| Total Ni (mg/L) | 0.07 |
| Contact Time (min.) | 0.07 |

-continued

Raney Co

| | |
|---|---|
| Flow rate (mL/Min.) | 98 |
| Pressure (kPa) | 225 |
| Temperature (°C.) | 18 |
| Feed Chlorine (mg/L) | 1.49 |
| Product Chlorine (mg/L) | 0.06 |
| Total Co (mg/L) | 0.26 |
| Total Cu (mg/L) | <0.01 |
| Total Ni (mg/L) | <0.01 |
| Contact Time (min.) | 0.06 |

Note: A small amount (<1 mg/L) of the metal the catalyst is made from shows up in the effluent. This is believed to be experimental error. Probably a few small particles made it past the filter and showed up in the sample. When the sample was acidified, these particles dissolved resulting in detectable concentrations of metals in the product. With a little more care, much lower concentrations can be expected.

EXAMPLE 3

Alumina Doped with Nickel Dechlorinates Water similar to the Spongy Metals in Example 1

Add to each glass bottle a 10 g sample of alumina doped with nickel and label each bottle. Next, add 50 mL of approximately 1 mgL $Cl_2$ to each bottle. Wait 10 minutes and measure each bottle for total chlorine.

| Compound | Initial mg/L $Cl_2$ | Final mg/L $Cl_2$ |
|---|---|---|
| C13-4-04 ⅛" spheres | 1.10 | 0.09 |
| C46-8-03 ⅟₁₆" extrudates | 1.10 | 0.01 |
| C46-8-03 | 1.10 | 0.04 |

This data when compared with the metal powders used in example 1 show a much faster rate of chlorine removal.

The surface area per mass for these compounds in $m^2/gm$ are 125–185 for C13-4-04, 180–280 for C46-8-03 ⅟₁₆" extrudates, and 200–249 for C46-8-03 ⅛" CDS.

EXAMPLE 4

Alumina Doped with Nickel Used in a Continuous Dechlorination Process With Very Fast Contact Times In the test equipment shown in FIG. 1, the following test was run with a 30 L volume of water. A sample was taken at the end of the run, the operation parameters recorded, and the sample analyzed for total chlorine.

| C46-8-3-1/16 | |
|---|---|
| Flow rate (mL/min.) | 152 |
| Pressure (kPa) | 225 |
| Temperature (°C.) | 20.2 |
| Feed Chlorine (mg/L) | 2.45 |
| Product Chlorine (mg/L) | 0.04 |
| Contact Time (min.) | 0.06 |

The operating pH for this process is 3 to 14.
The operating temperature range is 1° to 99° C.

Various combinations of transition metals such as vanadium, chromium, manganese, iron, cobalt, nickel, copper, and zinc could be alloyed with aluminum, the aluminum leached out by caustic, and the resulting spongy alloy could have similar or superior dechlorination properties. Alumina may be doped with more than one transition metal.

In a particular embodiment, it was found that a 5 g (4 mL) to 500 g (400 mL) quantity of catalyst could be used to treat a chlorinated stream with flow rate of 0.19 to 19.0 L/min. A typical kitchen faucet delivers about 4 gal/min or 15.1 L/min.

The invention may find use in destroying other oxidants in water such as hydrogen peroxide, chloramines, ozone, chlorine dioxide, chlorites, chlorates, bromites, bromates, etc. The use of Raney alloys or alumina doped with a transition metal (s) and an oxidant such as chlorine, hydrogen peroxide, etc., could find use in the catalytic oxidation of organics in water.

The catalyst can be used in powder form as in EXAMPLE 2, or through the techniques of powder metallurgy, various fused metal shapes may be manufactured.

The inventive concept of using high surface area per mass with transition metals to cause an "instant" removal of trace chlorine from water may involve adding these compounds to other inert supports with a high surface area per mass.

In addition to the metals suggested in this invention, others may be used. However, the platinum metals are known to decompose chlorine in water. The platinum metals are much more expensive than the metals used in the present invention.

The present invention has many advantages over the prior art:

The present dechlorination process is very fast due to the high surface area per mass. This allows for a continuous process in which large tanks are not required to increase reaction time. For example, a small part, for example, a one inch pipe, one inch in length, could be installed on a domestic water faucet to remove objectionable chlorine.

There are no chemicals required for the present process. The chemical reaction may be written:

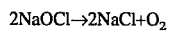

$$2NaOCl \rightarrow 2NaCl + O_2$$

The materials described in the invention act as catalysts.

Because no chemicals are required with this dechlorination process, no additional ionic species are added to the water.

No dangerous levels of toxic heavy metals are added to the water.

There is no known consumption of the chemicals (as would be the case with chemicals such as sulfite or activated carbon).

Prior art hydrogenation catalysts are substances used with hydrogen gas to reduce (or add hydrogen) to non-aqueous liquids such as fats and oils. Industrially, these reactions are performed in excess of 200° C. In the present invention, these materials are used without hydrogen and with aqueous liquids (or water) for the purpose of an instant autodecomposition of chlorine species to chloride ion and oxygen gas. The process of the invention operates at room temperature.

What is claimed is:

1. A water filtering process, said process comprising:
   contacting chlorine containing water, having a pH value between 3 to 14, with a catalyst bed operated at substantially room temperature and without hydrogen gas being present and comprising a decomposition catalyst consisting of Raney metals with a surface area per mass value of between 125 and 249 $m^2/gm$, so as to cause substantially instantaneous decomposition of chlorine species in the water to chloride ions and oxygen gas.

2. The process of claim 1 wherein said catalyst comprises Raney metals selected from the group consisting of Raney Cu, Raney Ni, and Raney Co.

3. A process as claimed in claim 1 wherein the time of contact between the water and the decomposition catalyst is 0.06 or 0.07 minutes.

4. A process using transition metals with high surface area per mass, said process comprising:

contacting a chlorine containing water stream, having a flow rate of 0.19 to 19 L/min and a pH value between 3 to 14, with a catalyst bed operated at substantially room temperature and without hydrogen gas being present, and comprising a decomposition catalyst having a surface area per mass value of between 125 and 249 $m^2/gm$, and selected from the group consisting of Raney Cu, Raney Ni, Raney Co, and spongy alloys of aluminum doped with transition metals selected from the group consisting of vanadium, chromium, manganese, iron, copper, and zinc, so as to provide substantially instantaneous decomposition of chlorine species in said water stream to chloride ions and oxygen gas.

5. A process as claimed in claim 4 wherein the time of contact between the water and the decomposition catalyst is 0.06 to 0.07 minutes.

* * * * *